2,909,549

ALKOXY-ENDBLOCKED SILICONE POLYMERS

Donald L. Bailey, Snyder, N.Y., assignor to Union Carbide Corporation, a corporation of New York No Drawing. Application December 14, 1953
Serial No. 398,225

29 Claims. (Cl. 260—448.8)

This invention relates to a method for making siloxanes having alkoxy groups attached to terminal silicon atoms.

Siloxane polymers of this type have also been termed alkoxy-endblocked siloxanes, and they have been prepared heretofore by the controlled hydrolysis of dialkoxysilanes as described in U.S. Patent No. 2,415,389. This method is difficult to control and gives rise to a mixture of products. Also, it is difficult to form alkoxy-endblocked siloxanes of high viscosity by this method.

According to this invention, alkoxy-endblocked siloxanes may be made in a wide range of viscosities and molecular weights, and process conditions can be controlled to give siloxane polymers of the desired characteristics. Thus, one aspect of my invention involves the polymerization of a lower molecular weight siloxane, such as the dimethyl siloxane cyclic tetramer, in the presence of a dialkoxysilane. The molar ratio of siloxane to dialkoxysilane employed determines the viscosity and average molecular weight of the alkoxy-endblocked siloxane formed.

My invention is predicated on the discovery that compounds containing

≡Si—O—C≡ bonds and ≡Si—O—Si≡ bonds react with each other in the presence of alkaline catalysts to exchange silicon atoms. This is illustrated by the following general equation:

≡Si—O—Si≡ + ≡Si*—O—C≡ ⇌
≡Si*—O—Si≡ + ≡Si—O—C≡

Usually, the silicon-oxy-carbon bond will be present in one compound, as in dimethyldiethoxysilane, and the silicon-oxy-silicon bond will be present in another compound, as in dimethyl siloxane cyclic trimer or tetramer, but the invention can be demonstrated with compounds which contain both types of bonds in a single molecule. Thus, diethyltetraethoxydisiloxane will rearrange when heated in the presence of an alkaline catalyst to form ethyltriethoxysilane and a polymer as follows:

Et(EtO)$_2$SiOSi(OET)$_2$Et → EtSi(OEt)$_3$ + polymer

The usual embodiment of the invention involves heating in the presence of an alkaline catalyst a siloxane free of alkoxy groups with an alkoxy silane having at least one hydrocarbon radical attached to the silicon atom or with a polysiloxane having at least one hydrocarbon radical and at least one alkoxy group attached to the same silicon atom. Under these conditions alkoxy-endblocked siloxane polymers are formed. Preferably the siloxane free of alkoxy groups is a dialkyl or diaryl cyclic trimer or tetramer.

The nature of these polymers depends on the starting materials. In one type, a dialkoxy silane is reacted with a difunctional siloxane to form a linear polymer as follows:

R′$_2$Si(OR″)$_2$ + n(R$_2$SiO)$_x$ →

R″O—(R$_2$SiO)$_{nx}$—SiR′$_2$—OR″   (I)

or

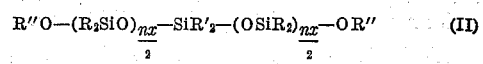

R″O—(R$_2$SiO)$_{nx}$—SiR′$_2$—(OSiR$_2$)$_{nx}$—OR″   (II)

In the above equation $x$ represents the number of monomeric siloxane units in the starting siloxane, being 3 or 4 respectively for a trimeric or tetrameric cyclic siloxane, $n$ represents the number of molecules of this siloxane which have entered into the final alkoxy-endblocked siloxane polymer, and $(nx)$ represents the average degree of polymerization, it being understood that the final polymeric mixture contains molecules which are both smaller and larger than the average. Also, R″ represents an alkyl or alkenyl radical, and R and R′ represent hydrocarbon radicals, such as alkyl, vinyl, aryl or aralkyl radicals. In the final polymer, it is indeterminate whether the (R′)$_2$Si radical of the dialkoxysilane is in the terminal position, or in an intermediate position in the polymer chain, but its exact location has little effect on polymer properties. Also where R′ is the same radical as R, structures (I) and (II) are identical. The most significant characteristic of the polymers is that they contain the terminal alkoxy groups —OR″. These alkoxy groups are capable of further reaction, as by hydrolysis or condensation.

The molecular weight of the final polymer is determined by the charging ratio of the siloxane to the alkoxysilane, and the determined molecular weight of the lower polymers agrees well with the molecular weight calculated from charging ratios. The molecular weights of the higher polymers are more difficult to determine, but the viscosity of the products, an indication of molecular weight, does increase progressively with the molecular weight calculated from charging ratios. Thus, the invention makes possible the production of alkoxy-endblocked siloxanes of predetermined molecular weight and viscosities as illustrated by the equations below for representative preparations.

(CH$_3$)$_2$Si(OC$_2$H$_5$)$_2$ + (Si(CH$_3$)$_2$O)$_4$ →
C$_2$H$_5$O(Si(CH$_3$)$_2$O)$_5$C$_2$H$_5$ (CH$_3$)$_2$Si(OC$_2$H$_5$)$_2$ + 2(Si(CH$_3$)$_2$O)$_4$ →
C$_2$H$_5$O(Si(CH$_3$)$_2$O)$_9$C$_2$H$_5$ (CH$_3$)$_2$Si(OC$_2$H$_5$)$_2$ + 8(Si(CH$_3$)$_2$O)$_4$ →
C$_2$H$_5$O(Si(CH$_3$)$_2$O)$_{33}$C$_2$H$_5$

In forming another type of siloxane polymer having alkoxy groups attached to terminal silicon atoms, a trialkoxy silane is reacted with a siloxane. A way of illustrating one type of polymer formed from a siloxane of the type (R$_2$SiO)$_x$ is as follows:

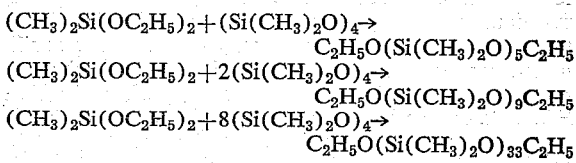

R′Si(OR″)$_3$ + 3n(R$_2$SiO)$_x$ ⟶ R′Si[—O(R$_2$SiO)$_{nx}$R″]$_3$

In this instance, a branched-chain polymer is represented, and R, R′, R″, $n$, $x$ and $nx$ are as previously designated. The alkoxy-endblocked siloxane polymers made from trifunctional alkoxy silanes as endblockers also increase progressively in molecular weight and viscosity with increase in the ratio of siloxane to trialkoxysilane charged. These trialkoxypolysiloxanes may be represented generically by the formula—

(R′SiO$_3$)(R$_2$SiO)$_z$(R″)$_3$ where R, R′ and R″ are as previously designated and $z$ is an integer having a value of at least 2, and preferably having a value of at least 8. This formula includes not only the branched-chain polymers shown previously, but also linear trialkoxypolysiloxanes having an alkoxy group attached to trifunctional silicon atom located intermediately in the chain, i.e.

R″(SiR$_2$O)$_4$OSiR′O(SiR$_2$O)$_4$R″
|
OR″

A third type of polymer having an alkoxy group attached to a terminal silicon atom is formed by reacting a siloxane with a monoalkoxy silane. In this case, a siloxane polymer endblocked with a single alkoxy group is formed among other products as follows:

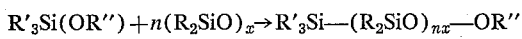

$$R'_3Si(OR'') + n(R_2SiO)_x \rightarrow R'_3Si\text{---}(R_2SiO)_{nx}\text{---}OR''$$

Mixtures of any of the above three types of polymer may also be obtained by reacting a siloxane with a mixture of alkoxysilanes, such as a mixture of any two from the group of monoalkoxy silanes, dialkoxy silanes, and trialkoxy silanes. The molecular weight and viscosity of such mixtures may be controlled by adjusting the molar ratio of the siloxane to the total moles of alkoxysilanes employed, and the properties of such mixtures will be determined by the proportions in which the respective alkoxysilanes are employed.

A fourth type of polymer is obtained when a trifunctional siloxane polymer of the type $(RSiO_{3/2})_n$ is reacted with a trialkoxysilane. In this instance, polymers of different viscosities than the starting polymer result, and the resulting polymers contain alkoxy groups. By virtue of such groups they may be combined with alkyd resins by ester exchange of the alkoxy group with hydroxyl groups present in the alkyd resin. This fourth type of reaction may be represented as follows, where $x$ is usually at least 8:

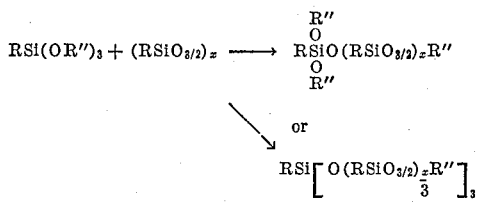

The above equation indicates that in some instances an alkoxy-endblocked polymer of increased molecular weight is formed. However, the viscosity and thus the molecular weight of the final polymer may be higher or lower than the initial mixture of trialkoxysilane and trifunctional siloxane polymer depending on the viscosity of the starting polymer. Low viscosity polymers give equilibrated products of increased viscosity and high viscosity polymers give equilibrated products of lower viscosity. However, for the same molar ratios of trifunctional siloxane polymer to trialkoxy silane, the final viscosity of the equilibrated products will be approximately the same regardless of whether the starting polymer is of high or low viscosity.

Complex mixtures of alkoxy-endblocked siloxanes can also be formed by reacting mixtures of difunctional siloxanes and trifunctional siloxanes with mono-, or di- or trialkoxysilanes or mixtures thereof.

The reactions between a siloxane free of alkoxy groups with an alkoxy silane will occur on mixing the ingredients in the presence of an alkaline catalyst at room temperature, but the rate of reaction is very slow. It is preferred to heat the reaction mixture at 50° C. to 200° C. to accelerate the reaction. At temperatures of 150° C. the reaction is usually complete in two to three hours. As an alkaline catalyst I prefer to use a potassium silanolate catalyst $KO(Me_2SiO)_xK$ which is prepared by heating potassium hydroxide with dimethyl siloxane cyclic tetramer. Usually such catalysts contain about 3% potassium by weight. The amount of such catalyst may vary from 0.3% to 10% by weight of the reaction mixture. On a potassium content, this amounts to 0.01% to 0.30% by weight of potassium in the reaction mixture.

Other alkaline catalysts may however be used, such as potassium hydroxide, sodium hydroxide, alkali metal alkoxides, such as potassium methoxide and butoxide, tertiary amines, and quaternary ammonium compounds, such as tetramethyl ammonium hydroxide.

In addition to the desired viscous products, the reaction produces a small amount of light products which can be stripped from the reaction mixture. For accurate determination of physical properties, it is necessary to remove such light products, but this is not necessary for many industrial uses of the products as oils, intermediates, dielectric agents and water-repellent agents.

The reaction should also be carried out under substantially anhydrous conditions as the presence of water causes undesired hydrolysis reactions.

The examples to follow will be divided into separate parts to illustrate the various embodiments of the invention.

PART A

EXAMPLES 1 TO 11.—REACTION OF DIALKOXY SILANES WITH DIFUNCTIONAL SILOXANES

*Example 1.—Purified linear endblocked polymer*

In a 500 ml. round bottom flask there were placed: 0.5 mole (148 grams) of dimethylsiloxane cyclic tetramer, 0.1 mole (14.8 grams) of dimethyldiethoxysilane and 0.5 gram of potassium dimethylsilanolate containing 3.0% K by weight. The flask was equipped with a reflux condenser and then placed in a constant temperature bath at 150° C. for 5 hours. The reactants were then cooled and filtered to remove a small amount of white solid suspended in the oil. The 162 grams of polymeric oil obtained was divided into two portions.

I. A 65-gram portion of the product had the following properties:

Viscosity at 25° C. _____ cs. __ 16.9
Percent OEt, by weight _____ percent __ 5.3±0.3
Molecular weight:
    Calculated _____ 1628
    From OEt analysis _____ 1695

II. The 97 gram portion of product was stripped under reduced pressure at 150° C. for 15 minutes. 86 grams of clear oil were obtained with the following properties:

Viscosity at 25° C. _____ cs. __ 22.1
Percent OEt, by weight _____ percent __ 5.3±0.3
Molecular weight:
    Calculated _____ 1628
    By OEt analysis _____ 1655
    Cryoscopic in cyclohexane _____ 1495

The light fractions from the stripping operation were collected in a Dry-Ice trap and they had the following properties:

Weight_____ 11 g. (11.3 wt.-percent of the oil).
$n_D^{25}$ _____ 1.3930 (For comparison $n_D^{25}$ $(Me_2SiO)_4$ is 1.3943).
Percent OEt__ 9.0.

The calculated average molecular weight listed for this and the other products is that molecular weight calculated from the molar ratio of the ethoxysilane endblocker to the siloxane present in the starting material.

It will be noted that the product from which the light fraction had been stripped was of higher viscosity than the crude product. Molecular weights of the purified product were determined by three methods; calculation from charging ratios, by a cryoscopic method, and from the ethoxy content on the assumption that the molecule contained two ethoxy groups. Good agreement between the molecular weight values so determined shows the polymer is a dialkoxy compound, and that the molecular weight of the polymer is determined by the charging ratio of the reactants.

*Example 2.—Linear endblocked polymers of different viscosities*

In a large test tube there were placed 6.67 grams of dimethyldiethoxysilane, 13.33 grams of dimethylsiloxane cyclic tetramer, and 0.10 gram of potassium dimethyl silanolate catalyst (containing 3 weight-percent potassium). The test tube was tightly stoppered and heated in an oil bath at 150° C. for three hours. The unstripped polymeric oil thus obtained had a viscosity of 2.2 centistokes at 100° F. A cryoscopic molecular weight measurement in cyclohexane gave a value of 440 (calculated value based on amount of dimethyldiethoxysilane used as endblocker was 444).

Using a similar procedure to that described above, samples of alkoxy-endblocked dimethylsiloxane polymers were prepared used various amount of dimethydiethoxysilane as the endblocker. The results of these experiments are listed in Table I.

concentrations using in each case 15 grams of reactants and a molar ratio of $(Me_2SiO)$ to $Me_2Si(OEt)_2$ of 64 to 1. A typical experiment follows:

In a large test tube there were placed 14.55 grams of dimethyl siloxane cyclic tetramer, 0.45 gram of dimethyldiethoxysilane and 0.208 gram of potassium dimethylsilanolate catalyst (containing 3 wt.-percent potassium). The test tube was tightly stoppered and immersed in an oil bath at 150° C. for 3 hours. The viscosity of the resulting silicone oil was 57 centistokes at 100° F.

TABLE I.—ALKALINE CATALYZED EQUILIBRATION OF CYCLIC DIMETHYLSILOXANE TETRAMER AND DIMETHYLDIETHOXYSILANE AT 150° C. FOR 3 HOURS

| Exp't. No. | Reactants | | Product | | | |
|---|---|---|---|---|---|---|
| | Moles $(Me_2SiO)$ / Moles $Me_2Si(OEt)_2$ | Potassium Silanolate Catalyst [1] (wt. percent) | Viscosity in cstk. | | Molecular Weight | |
| | | | 100° F. | 210° F. | Calculated | Found [2] |
| a | 4 | 0.5 | 2.2 | 1.2 | 444 | 440 |
| b | 8 | 0.5 | 4.8 | 2.3 | 740 | 709 |
| c | 16 | 0.5 | 10.6 | 4.7 | 1,332 | 890 |
| d | 32 | 0.5 | 25.9 | 11.7 | 2,516 | [3] 1,255 |
| e | 64 | 0.5 | 53.1 | | 4,884 | |
| f | 80 | 0.3 | 80.5 | | 6,068 | |
| g | 110 | 0.3 | 128.8 | | 8,288 | |
| h | 130 | 0.3 | 139.1 | | 9,768 | |

[1] Contains 3.0 wt. percent potassium.
[2] Cryoscopic values in cyclohexane.
[3] After removal of 9.6% lights the molecular weight was found to be 2394.

It will be noted that the viscosities increase progressively with the charging ratio of $(Me_2SiO)$ to $Me_2Si(OEt)_2$ and that there is good agreement between the molecular weights determined cryoscopically (after removal of light fractions) and those calculated from the charging ratios. Experiment a in the table represents the data for the above experiment where one mole of $(Me_2SiO)_4$ was reacted with one mole of $Me_2Si(OEt)_2$, Me and Et representing the methyl and ethyl radicals respectively.

*Example 3.—Effect of reaction time on product viscosity*

A series of reactions were conducted for various times. A typical experiment follows:

In a large test tube there were placed 23.68 grams of dimethylsiloxane cyclic tetramer, 1.48 grams of dimethyldiethoxysilane and 0.12 gram of potassium dimethylsilanolate catalyst (containing 3 wt.-percent potassium). The test tube was tightly stoppered and immersed in an oil bath at 150° C. for 5 hours. At the end of this time the viscosity of the reaction mixture was 23.5 centistokes at 100° F.

The results of several experiments are given in Table II to follow and show that the reaction is substantially complete in one to three hours.

TABLE II.—ALKALINE-CATALYZED EQUILIBRATION OF CYCLIC DIMETHYLSILOXANE TETRAMER AND DIMETHYLDIETHXOYSILANE AT 150° C.

| Exp't. No. | Moles $(Me_2SiO)$ / Moles $Me_2Si(OEt)_2$ | Potassium Silanolate Catalyst (Wt. Percent) | Equilibration Time (Hr.) | Product Viscosity (cstk. at 100° F.) |
|---|---|---|---|---|
| a | 32 | 0.5 | 1 | 23.6 |
| b | 32 | 0.5 | 3 | 23.8 |
| c | 32 | 0.5 | 5 | 23.5 |
| d | 32 | 0.5 | 7 | 24.1 |
| e | 32 | 0.5 | 24 | 25.8 |

*Example 4.—Effect of catalyst concentration*

A series of runs were made with different catalyst concentrations

The results of the experiments are given in Table III to follow:

TABLE III.—ALKALINE-CATALYZED EQUILIBRATION OF CYCLIC DIMETHYLSILOXANE AND DIMETHYLDIETHOXYSILANE AT 150° C. FOR 3 HOURS
[Wt. of reaction mixture was 15 grams.]

| Exp't. No. | Moles K × 10⁻⁴ as KO$(Me_2SiO)_xK$ | Wt. Percent K-Silanolate Containing 3 Wt. Percent K | Viscosity (cstk. at 100° F.) |
|---|---|---|---|
| e (Table I) | | 0.5 | 53.1 |
| a | 1.6 | 1.2 | 57.0 |
| b | 2.4 | 1.8 | 59.4 |
| c | 3.1 | 2.3 | 61.3 |
| d | 3.9 | 2.9 | 62.5 |
| e | 4.7 | 3.5 | 64.6 |
| f | 5.5 | 4.1 | 62.6 |
| g | 6.3 | 4.7 | 64.5 |
| h | 7.5 | 5.6 | 63.6 |
| i | 10.0 | 7.5 | 66.4 |
| j | 12.5 | 9.4 | 69.2 |

These results show that a catalyst concentration of less than 1 wt.-percent potassium silanolate is effective to produce the desired polymers. While higher catalyst concentrations can be used, as shown in the above table, they are not preferred as the increased polymer viscosity may be caused by loss of alkoxy groups, and further condensation influenced thereby, which is undesirable.

*Example 5.—Linear enblocked polymers from crude siloxanes*

The foregoing examples have illustrated the preparation of alkoxy endblocked linear siloxane polymers from dimethyl siloxane cyclic tetramer. It is also possible to use crude materials resulting from the hydrolysis of dimethyl dichlorosilane, as shown below.

In a flask equipped with a reflux condenser there were placed 1110 grams of chloride-free dimethyl hydrolyzate from dimethyl dichlorosilane, viscosity 3500 centistokes at 25° C., 444 grams of chloride-free dimethyldiethoxysilane, and 7.7 grams of potassium silanolate catalyst (containing 3.0 wt.-percent potassium). The mixture was heated at 150° C. for 3 hours in an oil bath and then cooled to room temperature. The resulting oil was centrifuged to remove any suspended solid material present. It had a viscosity of 2.7 centistokes at 100° F.

In another preparation in which the molar ratio of (Me$_2$SiO) to Me$_2$Si(OEt)$_2$ was 12 to 1, instead of 5 to 1, the viscosity of the final product was 7.7 centistokes at 100° F.

*Example 6.—Linear endblocked polymer from diethyl siloxane cyclic trimer*

Several experiments were conducted with diethyl siloxane cyclic trimer equilibrated with dimethyldiethoxysilane and with diethyldimethoxysilane. A typical experiment follows:

In a 500 cc. flask equipped with a stopper there were placed 183.6 grams (0.6 mole) diethylsiloxane cyclic trimer, 14.8 grams (0.1 mole) of diethyldimethoxysilane and 1.0 gram of potassium dimethylsilanolate catalyst (containing 3.0 wt.-percent potassium). The mixture was heated in an oil bath at 150° C. for 3 hours. After cooling the mixture to room temperature and centrifuging to remove a small amount of suspended solid, there was obtained 194 grams of clear oil having a viscosity of 152 centistokes at 100° F.

The results of this and another experiment are given in the following table:

The details of several of these experiments are given below:

*Experiment a.*—In a large test tube there were placed 11.84 grams of dimethylsiloxane cyclic tetramer, 10.88 grams of diphenyldiethoxysilane and 0.12 gram of potassium silanolate catalyst (containing 3 wt.-percent potassium). The test tube was tightly stoppered and immersed in an oil bath at 150° C. for 3 hours. The resulting endblocked polymer had a viscosity of 6.9 centistokes at 100° F.

*Experiment f.*—In a 500-cc. flask there were placed 206.2 grams (0.7 mole) of dimethylsiloxane cyclic tetramer, 14.8 grams (0.1 mole) of diethyldimethoxysilane and 1.0 gram of potassium dimethylsilanolate catalyst (containing 3 wt.-percent potassium). The flask was tightly stoppered and heated in an oil bath at 150° C. for 3 hours. After cooling to room temperature the mixture was centrifuged to remove a small amount of suspended solid material. There was obtained 220 grams of clear oil having a viscosity of 24.1 centistokes at 100° F.

*Experiment g.*—In a 500-cc. flask there were placed 148 grams (0.5 mole) of dimethylsiloxane cyclic tetramer, 76.5 grams (0.25 mole) of dimethyl-bis(2-ethylhexoxy)silane and 0.75 gram potassium dimethylsilanolate catalyst (containing 3 wt.-percent potassium). The flask was tightly stoppered and heated at 150° C. for TABLE IV.—EQUILIBRATION OF DIETHYLSILOXANE CYCLIC TRIMER WITH ALKOXYSILANES AT 150° C. FOR 3 HOURS

| Exp't. No. | Alkoxysilane Endblocker | Moles (Et$_2$SiO) / Moles Endblocker | Potassium Silanolate Catalyst (wt. percent) | Viscosity (cstk. at 100° F.) | Molecular Weight (calc.) |
|---|---|---|---|---|---|
| a | Et$_2$Si(OMe)$_2$ | 18 | 0.5 | 152 | 1,984 |
| b | Me$_2$Si(OEt)$_2$ | 30 | 0.5 | 403 | 3,236 |

The alkoxy-endblocked diethylsiloxane oils listed above are unstripped and contain low-boiling cyclic compounds.

*Example 7.—Linear endblocked polymers using other dialkoxy silanes*

Various other difunctional alkoxy silanes were also found to equilibrate in the presence of an alkaline catalyst with cyclic dimethylsiloxane tetramer to give linear alkoxy-endblocked oils. Among those tried were diphenyldiethoxysilane, diethyldimethoxysilane, dimethyldiallyloxysilane, tetramethyldiethoxydisiloxane, hexamethyldiethoxytrisiloxane and dimethyl-di-2-ethylhexoxysilane. The results of the equilibrations with these various compounds are contained in Table V.

5 hours in an oil bath. After cooling to room temperature and centrifuging the mixture to remove suspended solids there was obtained a clear oil having a viscosity of 7.2 centistokes at 100° F. The viscosity of the original mixture of reactants was 2.1 centistokes at 100° F.

The above polymeric oil was also stripped free of light fractions at 150° C. and 2 mm. Hg pressure for one hour after inactivation of the catalyst. The stripped oil had a viscosity of 7.7 centistokes at 100° F.

*Example 8.—Linear endblocked polymers using other cyclic difunctional siloxanes*

Various other cyclic siloxane trimers and tetramers were also found to equilibrate in the presence of an alkaline catalyst with dialkyl or diaryl dialkoxysilanes.

TABLE V.—EQUILIBRATION OF DIFUNCTIONAL-ALKOXYSILANES WITH CYCLIC DIMETHYLSILOXANE TETRAMER AT 150° C.
[Using 0.5 wt. percent KO(Me$_2$SiO)$_x$K catalyst.]

| Exp't. No. | Reactants | | Product | | |
|---|---|---|---|---|---|
| | Endblocker | Moles (Me$_2$SiO) / Moles Endblocker | Visc. in cstk. | | Calculated Mol. Wt. |
| | | | 100° F. | 210° F. | |
| a | (C$_6$H$_5$)$_2$Si(OEt)$_2$ | 4 | 6.9 | 2.7 | 568 |
| b | (C$_6$H$_5$)$_2$Si(OEt)$_2$ | 8 | 9.2 | 3.8 | 864 |
| c | (C$_6$H$_5$)$_2$Si(OEt)$_2$ | 16 | 15.7 | 6.4 | 1,456 |
| d | (C$_6$H$_5$)$_2$Si(OEt)$_2$ | 32 | 29.3 | 11.8 | 2,640 |
| e | (C$_6$H$_5$)$_2$Si(OEt)$_2$ | 64 | 60.8 | 25.0 | 5,008 |
| f | (Et)$_2$Si(OMe)$_2$ | 28 | 24.1 | | 2,220 |
| g | Me$_2$Si(OC$_8$H$_{17}$)$_2$* | 8 | 7.2 | | 850 |
| h | Me$_2$Si(OCH$_2$-CH=CH$_2$)$_2$ | 32 | 36.2 | | 2,568 |
| i | EtO(Me$_2$SiO)$_2$Et | 30 | 22.2 | | 2,516 |
| j | EtO(Me$_2$SiO)$_3$Et | 29 | 23.8 | | 2,516 |

*C$_8$H$_{17}$=2-ethylhexyl.

Among the cyclic siloxanes used were phenylmethyl siloxane cyclic trimer, ethylmethyl siloxane cyclic trimer, and mixtures of cyclic dimethyl siloxane tetramer with cyclic diethylsiloxane trimer and with phenylmethylsiloxane cyclic trimer. The results of the equilibrations with these various compounds are given in Table VI:

TABLE VI.—EQUILIBRATION OF DIFUNCTIONAL-ETHOXYSILANES WITH CYCLIC SILOXANES

[These experiments were carried out at 150° C. for 3–5 hr. using 0.5 wt. percent KO(Me₂SiO)ₓK (containing 3 wt. percent K) catalyst.]

| Exp't. No. | Cyclic Siloxane Used | Endblocker Used | Moles (R₂SiO) / Moles Endblocker | Viscosity (cs. at 25° C.) | Molecular Weight (calc.) |
|---|---|---|---|---|---|
| a | (φSiMeO)₃ | φ₂Si(OEt)₂ | 3 | 84.9 | 680 |
| b | (φSiMeO)₃ | φ₂Si(OEt)₂ | 7 | 329.0 | 1,204 |
| c* | (φSiMeO)₃ | φ₂Si(OEt)₂ | 12 | 694.2 | 1,904 |
| d | (φSiMeO)₃ | φ₂Si(OEt)₂ | 15 | 892.4 | 2,312 |
| e | (φSiMeO)₃ | φ₂Si(OEt)₂ | 30 | 1,895 | 4,352 |
| f | (φSiMeO)₃ | φ₂Si(OEt)₂ | 50 | 3,473 | 7,072 |
| g | (EtSiMeO)₃ | Me₂Si(OEt)₂ | 4 | 4.3 | 500 |
| h | (EtSiMeO)₃ | Me₂Si(OEt)₂ | 10 | 14.5 | 1,028 |
| i | (EtSiMeO)₃ | Me₂Si(OEt)₂ | 12 | 17.8 | 1,204 |
| j | (EtSiMeO)₃ | Me₂Si(OEt)₂ | 20 | 41.6 | 1,908 |
| k | (EtSiMeO)₃ | Me₂Si(OEt)₂ | 50 | 119.2 | 4,548 |
| l | (EtSiMeO)₃ | Me₂Si(OEt)₂ | 80 | 239.3 | 7,188 |
| m | (Me₂SiO)₄ / (Et₂SiO)₃** | Me₂Si(OEt)₂ | 4 | 4.5 | 500 |
| n | (Me₂SiO)₄ / (Et₂SiO)₃** | Me₂Si(OEt)₂ | 10 | 20.5 | 1,028 |
| o | (Me₂SiO)₄ / (Et₂SiO)₃** | Me₂Si(OEt)₂ | 12 | 22.3 | 1,204 |
| p | (Me₂SiO)₄ / (Et₂SiO)₃** | Me₂Si(OEt)₂ | 20 | 47.9 | 1,908 |
| q | (Me₂SiO)₄ / (Et₂SiO)₃** | Me₂Si(OEt)₂ | 50 | 124.1 | 4,548 |
| r | (Me₂SiO)₄ / (Et₂SiO)₃** | Me₂Si(OEt)₂ | 71 | 249.5 | 7,114 |
| s | (Me₂SiO)₄ / (φSiMeO)₃** | Me₂Si(OEt)₂ | 4 | 9.4 | 568 |
| t | (Me₂SiO)₄ / (φSiMeO)₃** | Me₂Si(OEt)₂ | 10 | 31.1 | 1,178 |
| u | (Me₂SiO)₄ / (φSiMeO)₃** | Me₂Si(OEt)₂ | 12 | 42.5 | 1,408 |
| v | (Me₂SiO)₄ / (φSiMeO)₃** | Me₂Si(OEt)₂ | 20 | 80.0 | 2,248 |
| w | (Me₂SiO)₄ / (φSiMeO)₃** | Me₂Si(OEt)₂ | 50 | 113.1 | 5,398 |

*This experiment was carried out using a reaction time of 16 hr.
**Equimolar ratio of the two monomer units, (R₂SiO).

The details of several of these experiments are given below:

*Experiment c.—Ethoxy-endblocked phenylmethylsiloxane polymer.*—In a 500-ml. flask there were placed 81.6 grams (0.2 mole) of phenylmethylsiloxane cyclic trimer, 13.6 grams (0.05 mole) of diphenyldiethoxysilane and 0.48 gram of potassium dimethylsilanolate catalyst (containing 3 wt.-percent potassium). The flask was tightly stoppered and heated in an oil bath at 150° C. for 16 hours. After cooling to room temperature there were obtained 95 grams of clear oil having the following properties:

Viscosity at 25° C. _____ cs__ 694.2
OEt _____percent__ 4.8±0.3
Molecular weight:
    Calculated _____ 1904
    By OEt analysis_____ 1875

The above oil (14.7 grams) when stripped under reduced pressure at 150° C. yielded no light fractions.

*Experiment i.—Ethoxy-endblocked ethylmethylsiloxane polymer.*—In a 500-ml. flask there were placed 105.6 grams (0.4 mole) of ethylmethylsiloxane cyclic trimer, 14.8 grams (0.1 moles) of dimethyldiethoxysilane and 0.6 gram of potassium dimethylsilanolate catalyst (containing 3.0 wt.-percent potassium). The flask was tightly stoppered and heated in an oil bath at 150° C for 5 hours. After cooling to room temperature, the product was filtered to remove a small amount of a white flocculent solid suspended in the oil. There was obtained 120 grams of a clear oil which was divided into two portions:

(I) 99 grams of product as such had the following properties:

Viscosity at 25° C. _____cs__ 17.8
OEt _____percent__ 6.8±0.2
Molecular weight:
    Calculated _____ 1204
    By OEt analysis _____ 1325

(II) 21.0 grams of product stripped under reduced pressure at 150° C. for 20 min. yielded 19.0 grams of clear oil having the following properties:

Viscosity at 25° C. _____cs__ 25.0
OEt _____percent__ 6.0±0.2
Molecular weight:
    Calculated _____ 1204
    By OEt analysis _____ 1500

The light fractions from the stripping operation were collected in a Dry-Ice trap and had the following properties:

Weight _____ 2.0 grams (10% of oil).
OEt _____percent__ 15.2±0.4

*Experiment o.—Ethoxy-endblocked dimethylsiloxanediethylsiloxane copolymer.*—In a 500-ml. flask there were placed 44.4 grams (0.15 mole) of dimethylsiloxane cyclic tetramer, 61.2 grams (0.2 mole) of diethylsiloxane cyclic trimer, 14.8 grams (0.1 mole) dimethyldiethoxysilane and 0.6 gram of potassium dimethylsilanolate catalyst (containing 3.0 wt.-percent potassium). The flask was tightly stoppered and heated in an oil bath at 150° C. for 5 hours. The product was then cooled and filtered to remove a small amount of white solid suspended in the oil. There was obtained 120 grams of a clear oil which was divided into two portions.

(I) 100 grams of oil as such had the following properties:

| | |
|---|---|
| Viscosity at 25° C. cs. | 22.3 |
| OEt percent | 6.7±0.3 |
| Molecular weight: | |
| Calculated | 1204 |
| By OEt analysis | 1325 |

(II) 20.0 grams of product stripped under reduced pressure at 150° C. for 20 minutes yielded 19.0 grams of clear oil having the following properties:

| | |
|---|---|
| Viscosity at 25° C. cs. | 27.7 |
| OEt percent | 5.4±0.2 |
| Molecular weight: | |
| Calculated | 1204 |
| By OEt analysis | 1662 |

*Experiment w.—Ethoxy-endblocked dimethylsiloxane-phenylmethylsiloxane copolymer.—*In a 500-ml. flask there were placed 29.6 grams (0.1 mole) of dimethylsiloxane cyclic tetramer, 54.4 grams (0.133 mole) of phenylmethylsiloxane cyclic trimer, 9.87 grams (0.067 mole) of dimethyldiethoxysilane and 0.47 gram of potassium dimethylsilanolate catalyst (containing 3.0 wt.-percent potassium). The flask was tightly stoppered and heated in an oil bath at 150° C. for 5 hours. The product was cooled and there was obtained 84 grams of clear oil which was divided into two portions.

(I) 69 grams of oil as such had the following properties:

| | |
|---|---|
| Viscosity cs. | 42.5 |
| OEt percent | 6.1±0.3 |
| Molecular weight: | |
| Calculated | 1408 |
| By OEt analysis | 1475 |

(II) 15.0 grams of product stripped under reduced pressure at 150° C. for 20 minutes yielded 14.7 grams of clear oil having the following properties:

| | |
|---|---|
| Viscosity cs. | 51.2 |
| OEt percent | 5.4 |
| Molecular weight: | |
| Calculated | 1408 |
| By OEt analysis | 1662 |

*Example 9.—Ethoxy-endblocked dimethylsiloxane-diphenylsiloxane copolymers*

In a 250-cc. flask equipped with a rubber stopper there were placed 99 grams (0.125 mole) of diphenylsiloxane cyclic tetramer, 37 grams (0.125 mole) of dimethylsiloxane cyclic tetramer, 27.2 grams (0.1 mole) of diphenyldiethoxysilane and 0.82 gram of potassium dimethylsilanolate catalyst (containing 3 wt.-percent potassium). The contents of the flask were heated to a temperature at which the diphenylsiloxane tetramer melted. At this point the flask was placed in a constant temperature bath at 150° C. for 4 hours. Upon cooling the reaction mixture there was obtained 164 grams of clear, polymeric oil having a viscosity of 1496 cs. at 25° C.

*Example 10.—Ethoxy-endblocked diphenylsiloxane polymers*

In a flask equipped with a rubber stopper there were placed 23.8 grams (0.03 mole) of diphenylsiloxane cyclic tetramer, 3.26 grams (0.012 mole) of diphenyldiethoxysilane and 0.135 gram of potassium dimethylsilanolate catalyst (containing 3 wt.-percent potassium). The mixture was heated to a melt under argon and then equilibrated at 150° C. for 5 hours. After cooling to room temperature there was obtained a waxy solid which softened at 60° C. and became a clear oil at 145° C.

*Example 11.—Aminoethoxy-endblocked phenylmethyl-siloxane polymers*

In a 500-cc. flask equipped with a rubber stopper there were placed 136 grams of phenylmethylsiloxane hydrolyzate, 17.8 grams (0.1 mole) of bis(2-aminoethoxy)dimethylsilane and 0.77 gram of potassium dimethylsilanolate catalyst (containing 3 wt.-percent potassium). The flask was heated in a constant temperature bath at 150° C. for 4 hours. At the end of this time there was obtained 150 grams of a clear polymeric oil having a viscosity of 376 cs. at 25° C. and containing 1.98% amino groups (theory 2.08%). The molecular weight of the polymer was 1610 based on amino end group analysis (calculated molecular weight 1538).

PART B

EXAMPLES 12 TO 13.—REACTION OF TRIALKOXYSILANES WITH DIFUNCTIONAL SILOXANES

*Example 12.—Branched-chain endblocked polymer*

In a 500 ml. flask equipped with a reflux condenser there were placed 0.45 mole (133.2 grams) of dimethylsiloxane cyclic tetramer, 0.1 mole (19.2 grams) of ethyltriethoxysilane and 0.45 gram of potassium dimethylsilanolate containing 3.0% by weight of potassium. The flask was then placed in a constant temperature bath at 150° C. for 5 hours. The product was then cooled and filtered to remove a small amount of a flocculent white solid suspended in the oil. There was obtained 151 grams of a clear oil which had the following properties:

| | |
|---|---|
| Viscosity at 25° C. cs. | 13.5 |
| Percent OEt percent | 9.3±0.3 |
| Molecular weight: | |
| Calculated | 1524 |
| By OEt analysis | 1460 |

Preparation of these polymers on a larger scale results in products having more clearly defined properties. Accordingly, 108.8 lb. of mixed cyclic dimethyl polysiloxanes containing approximately 22% of the tetramer, 20% of the pentamer and 56% of higher cyclic polymers, i.e. $(R_2SiO)_n$ where $n$ is at least 6, 15.6 lb. of ethyltriethoxysilane and 19.5 grams of powdered potassium hydroxide were charged to a Pfaudler kettle having a capacity of 30 gallons and equipped with an agitator. The agitator was turned on and the kettle temperature raised to 150° C. and held there for 3.5 hours. At the end of this time, the kettle was placed under reduced pressure and the light fractions stripped off at an absolute pressure of 2 in. Hg in the temperature range of 125° to 250° C. About 12 to 15% of the kettle contents were removed as light fractions.

The residue was a viscous oil having a molecular weight of 1500 measured cryoscopically. Its ethoxy content by analysis was 8.8 wt.-percent, in good agreement with the theoretical value of 9 wt.-percent for a trialkoxypolysiloxane of this molecular weight.

*Example 13.—Branched-chain alkoxy-endblocked siloxanes from trialkoxysilanes*

Various trifunctional alkoxysilanes were equilibrated with cyclic dimethylsiloxane tetramer in the presence of alkaline catalyst to give branched type polymers containing at least some structures of the type:

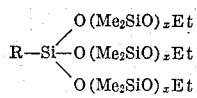

Phenyltriethoxysilane, ethyltriethoxysilane, vinyltriethoxysilane and hexaethoxydisilylethane were equilibrated with cyclic dimethylsiloxane tetramer. Data on these equilibrations are given in Table VII.

TABLE VII.—EQUILIBRATION OF TRIFUNCTIONAL ALKOXYSILANES WITH CYCLIC DIMETHYLSILOXANE TETRAMER AT 150° C. FOR 3 HOURS

[Using 0.5 wt. percent $KO(Me_2SiO)_xK$ as catalyst.]

| Exp't. No. | Endblocker | Moles $(Me_2SiO)$ / Moles Endblocker | Viscosity of Oil in cstk. | | Calculated Mol. Wt. |
|---|---|---|---|---|---|
| | | | 100° F. | 210° F. | |
| a | $EtSi(OEt)_3$ | 8 | 5.2 | 2.4 | 782 |
| b | $EtSi(OEt)_3$ | 16 | 9.6 | 4.4 | 1,374 |
| c | $EtSi(OEt)_3$ | 32 | 20.5 | 8.8 | 2,558 |
| d | $EtSi(OEt)_3$ | 64 | 44.5 | 19.0 | 4,926 |
| e | *$ViSi(OEt)_3$ | 8 | 4.7 | 2.1 | 780 |
| f | *$ViSi(OEt)_3$ | 32 | 16.4 | 7.0 | 2,556 |
| g | $C_6H_5Si(OEt)_3$ | 8 | 6.3 | 2.8 | 830 |
| h | $C_6H_5Si(OEt)_3$ | 32 | 23.2 | 9.7 | 2,608 |
| i | $[(EtO)_3Si]_2C_2H_4$ | 64 | 23.2 | | 5,090 |

*$CH_2=CH-$.

The procedural details for several of the experiments reported above are given below:

*Experiment a.*—In a large test tube there were placed 17.76 grams of dimethylsiloxane cyclic tetramer, 5.76 grams of ethyltriethoxysilane and 0.12 gram of potassium dimethylsilanolate catalyst (containing 3 wt.-percent potassium). The test tube was tightly stoppered and immersed in an oil bath at 150° C. for 3.5 hours. The resulting polymeric oil had a viscosity of 5.2 cs. at 100° F.

*Experiment e.*—In a large test tube there were placed 17.76 grams of dimethylsiloxane cyclic tetramer, 5.7 grams of vinyltriethoxysilane and 0.12 gram of potassium dimethylsilanolate catalyst (containing 3 wt.-percent potassium). The test tube was tightly stoppered and immersed in an oil bath at 150° C. for 3.0 hours. The resulting polymeric oil had a viscosity of 4.7 cs. at 100° F.

*Experiment g.*—In a large test tube there were placed 17.76 grams of dimethylsiloxane cyclic tetramer, 7.2 grams of phenyltriethoxysilane and 0.12 gram of potassium dimethylsilanolate catalyst (containing 3 wt.-percent potassium). The test tube was tightly stoppered and immersed in an oil bath at 150° C. for 6 hours. The resulting polymeric oil had a viscosity of 6.3 cs. at 100° F.

*Experiment i.*—In a large test tube there were placed 14.2 grams of dimethylsiloxane cyclic tetramer, 1.06 gram of hexaethoxydisilylethane and 0.2 gram of potassium dimethylsilanolate catalyst (containing 3 wt.-percent potassium). The test tube was tightly stoppered and immersed in an oil bath at 150° C. for 3 hours. The resulting polymeric oil had a viscosity of 23.2 cs. at 100° F.

PART C

EQUILIBRATION OF TRIFUNCTIONAL POLYSILOXANES WITH TRIALKOXYSILANES

Example 14

Trifunctional polysiloxanes undergo equilibration with alkoxysilanes in the presence of alkaline catalysts. This was demonstrated by experiments between completely condensed ethylpolysiloxane and ethyltriethoxysilane. These experiments are listed in Table VIII.

TABLE VIII.—EQUILIBRATION OF $EtSiO_{3/2}$ WITH $EtSi(OEt)_3$
[Using potassium butoxide catalysts.]

| Exp't No. | $(EtSiO_{3/2})_n$*, Moles | $EtSi(OEt)_3$, Moles | Viscosity of Mixture at 100° F. in cstk. | |
|---|---|---|---|---|
| | | | Before Equilibration | After Equilibration |
| a | **1 | 0.6 | 3 | 8.5 |
| b | 1 | 0.3 | 112 | 106.0 |
| c | 1 | 0.6 | 23 | 9.5 |
| d | 1 | 0.9 | 10 | 4 |

*Sample was a solid resin of approximately 4500 mol. wt.
**A lower molecular weight material.

PART D

EQUILIBRATION OF POLYSILOXANES WITH MONOALKOXY SILANES

*Example 15.*—Preparation of a linear dimethyl siloxane polymer endblocked by both trimethylsilyl and ethoxy groups In a 250 ml. flask there were placed 88 grams of chloride-free dimethyl hydrolyzate (viscosity at 25° C.–3500 cs.) obtained by hydrolysis of dimethyldichlorosilane, 11.8 grams (0.1 mole) of trimethylethoxysilane and 0.5 gram of potassium dimethylsilanolate catalyst (containing 3.0 wt.-percent potassium). The flask was equipped with a reflux condenser and heated in a constant temperature oil bath at 150° C. for 3 hours. The product was then cooled and filtered to remove a small amount of white solid suspended in the oil. A clear oil having a viscosity of 10.2 cs. at 25° C. was obtained.

In the above example it should be noted that the following types of endblocked polymers are present:

(1) $EtO(Me_2SiO)_xEt$
(2) $EtO(Me_2SiO)_xSiMe_3$
(3) $Me_3SiO(Me_2SiO)_xSiMe_3$

Of these, the second type is most prevalent.

PART E

PREPARATION OF SPECIFIC ALKOXY SILICON COMPOUNDS

At low ratios of siloxane to alkoxy silane it is possible to form specific alkoxy silicon compounds. Such compounds can also be formed by disproportionation of a silicon compound containing in the same molecule both a Si—O—Si bond and a Si—O—C bond.

*Example 16.—Disproportionation of 1,3-diethyltetraethoxydisiloxane*

In a 500 cc. flask connected to a fractionating column there were placed 153 grams of 1,3-diethyltetraethoxydisiloxane, 155 grams of tetralin and 12 grams of an ethanol solution containing 19 wt.-percent sodium ethoxide. The mixture was heated to reflux for 2.5 hours during which time 12.5 grams of material distilling below 80° C. and 144 grams of material distilling below 200° C. were removed from the head of the column. The material remaining in the reaction flask was a reddish-brown clear liquid weighing 161 grams. Distillation of the 144 grams of material distilling between 80° C. and 200° C. gave 114 grams of ethyltriethoxysilane, B.P. 159° C. to 161° C., density at 25° C.=0.89, representing an 89% conversion of the ethoxy groups present in the original compound to this compound.

*Example 17.—Equilibration of dimethyldiethoxysilane with dimethylsiloxane tetramer*

In a 250 ml. flask connected to a Vigreaux column there were placed 74 grams (0.25 mole) of dimethylsiloxane tetramer, 74 grams (0.50 mole) of dimethyldiethoxysilane and 0.8 gram of potassium silanolate catalyst (containing 3.0 wt.-percent potassium). The mixture was heated at 150° C. to 175° C. for 3.5 hours. Volatile products were then stripped through the column under reduced pressure. Fractionation of the 111 grams of volatile material at atmospheric pressure gave the following:

| Fraction | Boiling Point, ° C. | Density, 25° C. | $n_D^{20}$ | Grams |
|---|---|---|---|---|
| 1 | 107-113 | | | 19.4 |
| 2 | 113-160 | | | 10.7 |
| 3 | 160-161 | 0.88 | 1.3881 | 10.2 |
| 4 | 161-197.5 | | | 14.5 |
| 5 | 197.5-198.5 | 0.90 | 1.3920 | 35.7 |
| Res | | | | 19.1 |

Fraction 1 was mainly recovered dimethyldiethoxysilane; fraction 3 was tetramethyldiethoxydisiloxane; fraction 5 was hexamethyldiethoxytrisiloxane. Intermediate fractions were mixtures of these compounds.

*Example 18.—Preparation of trimethylethoxysilanes*

In a 1000-ml. flask there were placed 384 grams (1.0 mole) of dodecamethylpentasiloxane (Dow Corning 2.0 cs. dimethylsiloxane oil), 192 grams (1.0 mole) of ethyltriethoxysilane and 5.76 grams of potassium dimethylsilanolate catalyst (containing 3.0 wt.-percent potassium). The flask was heated to reflux under a fractionating column and low-boiling material taken off at the head. A small amount of material (10 grams) boiling below 75° C. and 183 grams of material boiling at 75-80° C. were obtained. This represents a conversion of 77.5% of all trimethylsilyl groups to trimethylethoxysilane which was recovered as a colorless liquid having the following properties:

B.P. _____ ° C__ 75-76
$D^{25}$ _____ g./cc__ 0.75
$n_D^{25}$ _____ 1.3715

*Example 19.—Equilibration of ethyltriethoxysilane with dimethylsiloxane tetramer*

A mixture of 78.8 grams (0.4 mole) of ethyltriethoxysilane and 59.2 grams (0.2 mole) of cyclic dimethylsiloxane tetramer containing 1.3 gram of potassium silanolate as catalyst was heated at 150° C. for 5 hours. After stripping the volatile material from the reaction mixture through a Vigreaux column under reduced pressure up to a kettle temperature of 165° C. at 0.5 mm., an insoluble gel weighing 25 grams remained in the reaction flask. The distillate (112 grams) was redistilled through a good fractionating column at atmospheric pressure.

| Fraction | Boiling Point, °C. | $n_D^{20}$ | Grams |
|---|---|---|---|
| 1 | 95-112.5 | | 1.0 |
| 2 | 112.5-114 | | 18.0 |
| 3 | 114-159 | | 5.0 |
| 4 | 159-162 | 1.3898 | 17.3 |
| 5 | 162-197 | | 7.9 |
| 6 | 197-199 | 1.3942 | 23.5 |
| Res | | | 35.2 |
| Loss | | | 4.1 |

In the above distillation only the dimethyldiethoxysilane fraction (Fraction 2) was obtained reasonably pure. It represents 20 mole-percent of the available ethoxy groups. Fraction 4 was a mixture of ethyltriethoxysilane and tetramethyldiethoxydisiloxane. Fraction 6 was mainly hexamethyldiethoxytrisiloxane but was impure.

PART F

EQUILIBRATION OF POLYSILOXANES WITH OTHER ALKOXY SILICON COMPOUNDS

In addition to the simple mono-, di- or trialkoxysilanes, there may be employed as endblockers more complex molecules of the trialkoxysilane type, such as hexaethoxydisilylethane, $(EtO)_3SiC_2H_4Si(OEt)_3$. Also, polysiloxanes containing alkoxy groups attached to silicon may be used.

*Example 20.—Preparation of a highly-branched dimethylsiloxane oil using hexaethoxydisilylethane as endblocker*

In a one-liter flask connected to a reflux condenser, there were placed 399.6 grams of dimethyl hydrolyzate from dimethyldichlorosilane, viscosity 3500 cs. at 25° C., 106.2 grams of hexaethoxydisilylethane, and 2.5 grams of potassium silanolate catalyst (containing 3.0 wt.-percent potassium). The mixture was heated at 150° C. for 3 hours in an oil bath and then cooled to room temperature. The 500 grams of polymeric oil obtained was centrifuged to remove any suspended solid material present. It had a viscosity of 11.2 cs. at 25° C. The product thus formed, as well as that of Experiment No. i, Table VII, is an example of a hexaalkoxypolysiloxane of the formula $(O_3SiRSiO_3)(R_2'SiO)_n(R'')_6$ where R is a divalent hydrocarbon radical, R' is a monovalent hydrocarbon radical, R" is an alkyl radical and is bonded to a silicon atom through an oxygen atom, and n is an integer of a value of at least 6.

*Example 21. — Preparation of an alkoxy-containing siloxane polymer consisting of dimethylsiloxane and phenylsiloxane units*

In a large test tube there were placed 12.6 grams of dimethylsiloxane cyclic tetramer, 8.25 grams of a phenylmethoxypolysiloxane containing 17 wt.-percent OMe groups (OMe/Si ratio 0.8) and 0.11 gram of potassium silanolate catalyst (containing 3.0 wt.-percent potassium). The mixture was heated at 150° C. in an oil bath for 3 hours and then cooled to room temperature. Initially, the reactants were not completely miscible. However, the reaction mixture became clear after heating a short time. A clear, polymeric oil was obtained having a viscosity of 267 cs. at 25° C.

What is claimed is:

1. Process for making alkoxy silicon compounds which comprises reacting under substantially anhydrous conditions and in the presence of an alkaline catalyst a silicon-oxy-silicon bond with a silicon-oxy-carbon bond in which the bonded carbon atom is part of an alkyl radical and in which the oxybonded silicon atom of the silicon-oxy-carbon bond is also bonded directly to carbon to effect an exchange of the alkyl radical.

2. Process for making alkoxy-endblocked siloxane polymers which comprises reacting under substantially anhydrous conditions and in the presence of an alkaline catalyst a siloxane containing at least one silicon-oxy-silicon bond and having no alkoxy groups attached to a silicon atom with a silicon compound having at least one hydrocarbon radical and at least one alkoxy group attached to the same silicon atom, and recovering as reaction products alkoxy-endblocked siloxane polymers.

3. Process for making alkoxy-endblocked siloxane polymers which comprises reacting under substantially anhydrous conditions and in the presence of an alkaline catalyst a siloxane containing at least one silicon-oxy-silicon bond and having no alkoxy groups attached to a silicon atom with an alkoxysilane in which silicon is bonded only to oxygen and carbon and having at least one hydrocarbon radical and at least one alkoxy group attached to the same silicon atom, and recovering as reaction products alkoxy-endblocked siloxane polymers.

4. Process for making alkoxy-endblocked siloxane polymers which comprises reacting under substantially anhydrous conditions and in the presence of an alkaline catalyst a siloxane of the group consisting of siloxanes of the formula $[(R_2)SiO]_x$ where $x$ has a value of at least 3 and siloxanes of the formula $(RSiO_{3/2})_y$ where $y$ has a value of at least 8, with an alkoxysilane of the group consisting of alkoxysilanes of the formula $$(R)_nSi(OR')_{4-n}$$

where $n$ is an integer from 1 to 3, and alkoxysilanes of the formula $(R'O)_3SiR''Si(OR')_3$ where $R''$ is a divalent hydrocarbon radical, R in each instance being a monovalent hydrocarbon radical and R' in each instance being a radical of the group consisting of alkyl, 2-aminoethyl and allyl.

5. Process for making alkoxy-endblocked siloxane polymers which comprises reacting under substantially anhydrous conditions and in the presence of an alkaline catalyst a siloxane of the formula $[(R)_2SiO]_x$, where $x$ has a value of at least 3, with a monoalkoxysilane of the formula $(R)_3SiOR^1$, R in both instances being a monovalent hydrocarbon radial and $R^1$ being an alkyl radical.

6. Process for making alkoxy-endblocked siloxane polymers which comprises reacting under substantially anhydrous conditions and in the presence of an alkaline catalyst a siloxane of the formula $[(R)_2SiO]_x$, where $x$ has a value of at least 3, with a dialkoxysilane of the formula $(R)_2Si(OR^1)_2$, R in both instances being a monovalent hydrocarbon radical and $R^1$ being an alkyl radical.

7. Process for making alkoxy-endblocked siloxane polymers which comprises reacting under substantially anhydrous conditions and in the presence of an alkaline catalyst a siloxane of the formula $[(R)_2SiO]_x$, where $x$ has a value of at least 3, with a trialkoxysilane of the formula $RSi(OR^1)_3$, R in both instances being a monovalent hydrocarbon radical and $R^1$ being an alkyl radical.

8. Process for making alkoxy-endblocked siloxane polymers which comprises reacting under substantially anhydrous conditions and in the presence of an alkaline catalyst a siloxane of the formula $(RSiO_{3/2})_y$, where $y$ has a value of at least 8, with a trialkoxysilane of the formula $RSi(OR^1)_3$, R in both instances being a monovalent hydrocarbon radical and $R^1$ being an alkyl radical.

9. Process for making alkoxy-endblocked siloxane polymers, which comprises reacting under substantially anhydrous conditions and in the presence of an alkaline catalyst a siloxane of the formula $[(R)_2SiO]_x$ where R is a monovalent hydrocarbon radical and $x$ is a number from 3 to 4, with an alkoxysilane of the formula $$(R)_nSi(OR')_{4-n}$$

where R is a monovalent hydrocarbon radical, R' is an alkyl radical and $n$ is an integer from 1 to 3, the molar ratio of the alkoxysilane to the siloxane reacted being from 1 to 1 to 1 to 100.

10. Process as claimed in claim 9 in which the R substituents in both formulas are taken from the group consisting of methyl, ethyl and phenyl radicals.

11. Process as claimed in claim 9 in which $x$ is 4 and $n$ is 2.

12. Process as claimed in claim 9 in which the alkaline catalyst is a potassium silanolate.

13. Process as claimed in claim 9 in which the alkaline catalyst is a potassium silanolate of the formula $$KO[(CH_3)_2SiO]_yK$$

the value of $y$ being such that the potassium content of the silanolate is about 3% by weight.

14. Process for making alkoxy-endblocked siloxane polymers, which comprises reacting under substantially anhydrous conditions and in the presence of an alkaline catalyst a siloxane of the formula $[(CH_3)_2SiO]_4$ with a dialkoxysilane of the formula $(CH_3)_2Si(OR)_2$ where R is an alkyl radical, the molar ratio of the dialkoxysilane to the siloxane reacted being from 1 to 1 to 1 to 100.

15. Process for making alkoxy-endblocked siloxane polymers, which comprises reacting under substantially anhydrous conditions and in the presence of an alkaline catalyst a siloxane of the formula $[(CH_3)_2SiO]_4$ with a trialkoxysilane of the formula $RSi(OR)_3$ where R is an alkyl radical, the molar ratio of the trialkoxysilane to the siloxane reacted being from 1 to 1 to 1 to 100.

16. Process for making alkoxy-endblocked siloxane polymers which comprises reacting under substantially anhydrous conditions and in the presence of an alkaline catalyst a siloxane containing at least one silicon-oxy-silicon bond and having no alkoxy groups attached to a silicon atom, with a polysiloxane having at least one hydrocarbon radical and at least one alkoxy group attached to the same silicon atom, and recovering as reaction products alkoxy-endblocked siloxane polymers.

17. Process for making alkoxysilanes which comprises heating under substantially anhydrous conditions and in the presence of an alkaline catalyst a siloxane containing in the same molecule both a silicon-oxy-silicon bond and a silicon-oxy-carbon bond in which the bonded carbon atom is part of an alkyl radical and in which the oxybonded silicon atom is also bonded directly to carbon of a monovalent hydrocarbon radical, and causing a disproportionation of said siloxane to form an alkoxysilane having more alkoxy groups attached to a single silicon atom than the starting siloxane.

18. Process as claimed in claim 17 in which said siloxane is 1,3-diethyltetraethoxydisiloxane.

19. Process for making alkoxy-endblocked siloxane polymers which comprises reacting under substantially anhydrous conditions and in the presence of an alkaline catalyst a siloxane of the formula $[(R)_2SiO]_x$ where $x$ has a value of at least 3, with a hexaalkoxysilane of the formula $(R'O)_3SiR''Si(OR')_3$, R being a monovalent hydrocarbon radical, R'' being a divalent hydrocarbon radical, and R' being an alkyl radical.

20. A polyalkoxypolysiloxane comprising a group from the class consisting of R—Si≡ and ≡Si—R'—Si≡ wherein R is a monovalent hydrocarbon radical and R' is a divalent hydrocabon radical, having from 2 to 6 siloxane chains composed of at least one unit of the formula $R_2SiO$ where R is as defined above each of said chains being connected at one end thereof to the silicon of said group through silicon to oxygen to silicon linkage, each of said chains being terminated at the other end thereof by an alkoxy radical and each remaining unfilled valence of the silicon of said group being satisfied by an alkoxy radical.

21. A trialkoxypolysiloxane of the formula $$(R''SiO_3)(R_2SiO)_n(R')_3$$

where R and R'' are monovalent hydrocarbon radicals, R' is an alkyl radical bonded to a silicon atom through an oxygen atom, and $n$ is an integer having a value of at least 2.

22. A trialkoxypolysiloxane of the formula $$(R''SiO_3)(R_2SiO)_n(R')_3$$

where R and R'' are monovalent hydrocarbon radicals, R' is an alkyl radical bonded to a silicon atom through an oxygen atom, and $n$ is an integer having a value of at least 8.

23. A hexaalkoxypolysiloxane of the formula $$(O_3SiR''SiO_3)(R_2SiO)_n(R')_6$$

where R'' is a divalent hydrocarbon radical, R is a monovalent hydrocarbon radical, R' is an alkyl radical and is bonded to a silicon atom through an oxygen atom, and $n$ is an integer having a value of at least 6.

24. A trialkoxypolysiloxane of the formula:

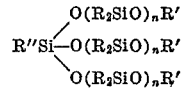

where R and R'' are monovalent hydrocarbon radicals, R' is an alkyl radical and $n$ is an integer having a value of at least 1.

25. A trialkoxypolysiloxane of the formula:

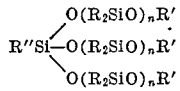

where R, R' and R'' are alkyl radicals and $n$ is an integer having a value of at least 1.

26. A trialkoxypolysiloxane as claimed in claim 25 in which R is a methyl radical.

27. A trialkoxypolysiloxane as claimed in claim 25 in which R is a methyl radical and R' is an ethyl radical.

28. A trialkoxypolysiloxane as claimed in claim 25 in which R is a methyl radical and R' is an ethyl radical and which has a viscosity at 100° F. of between 4.7 and 44.5 centistokes.

29. A trialkoxypolysiloxane as claimed in claim 25 in which R is a methyl radical and R' is an ethyl radical and which has an average molecular weight of about 1500.

References Cited in the file of this patent
UNITED STATES PATENTS 2,574,265    Hyde ------------------ Nov. 6, 1951

OTHER REFERENCES

Volnov: Jour. Gen. Chem. (USSR), vol. 10, 1940, pages 1600–1604.

Kautsky et al.: "Zeitschrift fur Naturforschung," vol. 5B (1950), p. 443.

Daubach, ibid., vol. 8B (1953), page 58.